United States Patent
Zhang

(10) Patent No.: US 11,742,719 B2
(45) Date of Patent: Aug. 29, 2023

(54) GIMBAL MOTOR MECHANICAL LIMITING DEVICE AND GIMBAL THEREOF

(71) Applicant: AUTEL ROBOTICS CO., LTD., Guangdong (CN)

(72) Inventor: Zhengli Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 48 days.

(21) Appl. No.: 17/449,513

(22) Filed: Sep. 30, 2021

(65) Prior Publication Data

US 2022/0021271 A1    Jan. 20, 2022

Related U.S. Application Data

(63) Continuation-in-part of application No. 16/045,092, filed on Jul. 25, 2018, now Pat. No. 11,159,106, which is a continuation of application No. PCT/CN2016/093604, filed on Aug. 5, 2016.

(30) Foreign Application Priority Data

Jan. 26, 2016    (CN) .......................... 201620077412.X

(51) Int. Cl.
*H02K 7/00*        (2006.01)
*H02K 5/16*        (2006.01)

(52) U.S. Cl.
CPC ............. *H02K 7/003* (2013.01); *H02K 5/161* (2013.01)

(58) Field of Classification Search
None
See application file for complete search history.

(56) References Cited

U.S. PATENT DOCUMENTS

| | | | | |
|---|---|---|---|---|
| 4,751,986 A | * | 6/1988 | Takahashi | G05G 5/04 188/82.2 |
| 5,771,753 A | * | 6/1998 | Kwon | B25J 9/101 74/526 |
| 5,839,322 A | * | 11/1998 | Genov | B25J 9/101 901/49 |

* cited by examiner

*Primary Examiner* — Naishadh N Desai

(57) ABSTRACT

The present application discloses a motor mechanical limiting device for limiting rotation of a motor. The device includes: a limiting ring, a first limiting device, and a second limiting device. The first limiting device is fixedly connected on a rotor of motor. The second limiting device is fixed on a motor stator. The limiting ring is in bearing connection with the rotor of motor. The limiting ring protrudes to form a stopping edge. Both the first limiting device and the second limiting device are located on a circumferential rotation path of the stopping edge, and the second limiting device is provided with a region for the first limiting device to pass through.

12 Claims, 3 Drawing Sheets

US 11,742,719 B2

GIMBAL MOTOR MECHANICAL LIMITING DEVICE AND GIMBAL THEREOF

CROSS-REFERENCE

This application is a continuation-in-part of U.S. application Ser. No. 16/045,092, filed on Jul. 25, 2018, which is a continuation application of International Application No. PCT/CN2016/093604, filed on Aug. 5, 2016, which claims priority of Chinese Patent Application 201620077412X, filed on Jan. 26, 2016, which is incorporated herein by reference in its entirety.

TECHNICAL FIELD

The present application relates to the field of limiting technologies, and in particular, to a gimbal motor mechanical limiting device and a gimbal thereof.

RELATED ART

A tri-axial gimbal generally includes three rotation axes: a yaw axis that controls the gimbal to rotate around the z-axis, a roll axis that controls the gimbal to rotate around the x-axis, and a pitch axis that controls the gimbal to rotate around the y-axis. Generally, in the prior art, the yaw axis is directly connected to a gimbal support and drives the gimbal to rotate around the y-axis. A cable is connected between the yaw axis and the gimbal support, the yaw axis is thus not allowed to drive the gimbal support to rotate infinitely. It is necessary to use a limiting device to limit a maximum rotation angle of a rotor of the yaw axis. In the prior art, two limiting methods used are a mechanical limiting device and a software limiting device. The mechanical limiting device generally implements limiting by using a limiting member fixed on a rotor of motor and a stop member fixed on a stator. By using such a limiting device, a rotation angle of the rotor is limited within 360°. A larger angle of rotation can not be achieved. When software limiting is used, a maximum rotation angle of the motor is preset, so that the rotor of the motor stops immediately upon reaching the maximum rotation angle. Such a limiting method has a high requirement on the motor, and requires as much as 100% of stability on the control of the programs. If the control programs fail, the cable between the yaw axis and the gimbal support will be broken by the rotor of the motor.

SUMMARY

A main technical problem to be solved by the present application is to provide a motor mechanical limiting device. In the mechanical limiting device, a limiting ring is in bearing connection with a rotor of motor; a first limiting device is fixed on the rotor of motor, and a second limiting device is fixed on the motor stator. During rotation, the motor first drives the first limiting device to rotate. When rotating to the limiting ring, the first limiting device drives the limiting ring to rotate together. The rotation stops at the second limiting device, so that a rotation angle of the rotor exceeds 360°.

In order to solve the foregoing technical problem, one technical solution used by the present application is: a motor mechanical limiting device for limiting rotation of a motor is provided, including: a limiting ring, a first limiting device, and a second limiting device. The first limiting device is fixedly connected on a rotor of motor. The second limiting device is fixed on a motor stator. The limiting ring is in bearing connection with the rotor of motor. The limiting ring protrudes to form a stopping edge. Both the first limiting device and the second limiting device are located on a circumferential rotation path of the stopping edge. The second limiting device is provided with a region for the first limiting device to pass through.

Further, the first limiting device includes: a connecting ring and a first connecting rod. The connecting ring is fixedly sleeved over the rotor of motor. One end of the first connecting rod is connected to the connecting ring, and the other end of the first connecting rod is bent to form a stopping head. During rotation, the stopping head pushes the stopping edge, so as to drive the limiting ring to rotate.

Further, the connecting ring is located under the limiting ring. The stopping head is located under the second limiting device.

Further, the second limiting device includes: a stop member and a second connecting rod. One end of the second connecting rod is fixed on the stator, and the other end of the second connecting rod is connected to the stop member. A region for the stopping head to pass through is formed between the second connecting rod and the stop member.

Further, the first limiting device comprises: a third connecting rod, wherein a protrusion of one end of the third connecting rod formed a stopping head, the other end of the third connecting rod is fixed on the rotor of motor, and wherein during rotation, the stopping head pushes the stopping edge, so as to drive the limiting ring to rotate.

Further, the third connecting rod is located upper the limiting ring, and the stopping head is located upper the second limiting device.

Further, the second limiting device comprises: a stop block, wherein the block is fixed on the stator of motor, the height of the stop block is less than a distance between the bottom of the stopping head and the stator of motor.

Further, the first limiting device comprises: a fourth connecting rod, wherein a protrusion of one end of the fourth connecting rod formed a stopping head, the other end of the fourth connecting rod is fixed on the rotor of motor, and wherein during rotation, the stopping head pushes the stopping edge, so as to drive the limiting ring to rotate.

Further, the fourth connecting rod is located upper the limiting ring, and the stopping head is located upper the second limiting device.

Further, the second limiting device comprises: a stop block, wherein the middle portion of the stop block provided an arc-shaped channel, the size of the arc-shaped channel fits the size of the bottom of the stopping head, forming a region 16 for the stopping head to pass through.

Further, the rotation angle range of the rotor of motor is greater than 0° and less than 720°.

In order to solve the foregoing technical problem, the present application further provides a gimbal, including a yaw axis structure driving the whole gimbal to rotate. The gimbal rotates around the yaw axis structure and the rotation is preset in a certain range. The gimbal further includes a motor mechanical limiting device disposed on the yaw axis structure. The motor mechanical limiting device defines a maximum rotation angle of the gimbal around the yaw axis.

Further, the motor mechanical limiting device includes: a limiting ring, a first limiting device, and a second limiting device. The first limiting device is fixedly connected on a rotor of motor. The second limiting device is fixed on a motor stator. The limiting ring is in bearing connection with the rotor of motor. The limiting ring protrudes to form a stopping edge. Both the first limiting device and the second limiting device are located on a circumferential rotation path of the stopping edge. The second limiting device is provided with a region for the first limiting device to pass through.

Further, the first limiting device includes: a connecting ring and a first connecting rod. The connecting ring is fixedly sleeved over the rotor of motor. One end of the first connecting rod is connected to the connecting ring, and the other end of the first connecting rod is bent to form a stopping head. During rotation, the stopping head pushes the stopping edge, so as to drive the limiting ring to rotate.

Further, the second limiting device includes: a stop member and a second connecting rod. One end of the second connecting rod is fixed on the stator, and the other end of the second connecting rod is connected to the stop member. A region for the stopping head to pass through is formed between the second connecting rod and the stop member.

Further, the first limiting device comprises: a third connecting rod, wherein a protrusion of one end of the third connecting rod formed a stopping head, the other end of the third connecting rod is fixed on the rotor of motor, and wherein during rotation, the stopping head pushes the stopping edge, so as to drive the limiting ring to rotate.

Further, the second limiting device comprises: a stop block, wherein the block is fixed on the stator of motor, the height of the stop block is less than a distance between the bottom of the stopping head and the stator of motor.

Further, the first limiting device comprises: a fourth connecting rod, wherein a protrusion of one end of the fourth connecting rod formed a stopping head, the other end of the fourth connecting rod is fixed on the rotor of motor, and wherein during rotation, the stopping head pushes the stopping edge, so as to drive the limiting ring to rotate.

Further, the second limiting device comprises: a stop block, wherein the middle portion of the stop block provided an arc-shaped channel, the size of the arc-shaped channel fits the size of the bottom of the stopping head, forming a region 16 for the stopping head to pass through.

Further, a motor of the yaw axis structure is a servo motor.

The present application has the following beneficial effects: A motor mechanical limiting device is provided. In the mechanical limiting device, the limiting ring is in bearing connection with a rotor of motor; the first limiting device is fixed on the rotor of motor, and the second limiting device is fixed on the motor stator. During rotation, the motor first drives the first limiting device to rotate. When rotating to the limiting ring, the first limiting device drives the limiting ring to rotate together. The rotation stops at the second limiting device. An actual rotation angle of the rotor of motor is an angle between the first limiting device and the limiting ring plus an angle between the limiting ring and the second limiting device. Moreover, the second limiting device is provided with a region for the first limiting device to pass through. Therefore, the sum of the two angles is greater than 360°.

DESCRIPTION OF REFERENCE NUMERALS IN THE DRAWINGS

10, limiting ring; 11, stopping edge; 12, first limiting device; 13, second limiting device; 14, third connecting rod; 15, fourth connecting rod; 16, region that the stopping head passes through; 17, stopping head; 20, yaw axis; 21, stator; 22, rotor.

Detailed Description

The present application is described in detail in the following with reference to the accompanying drawings and embodiments.

Embodiment 1

Figure 1:
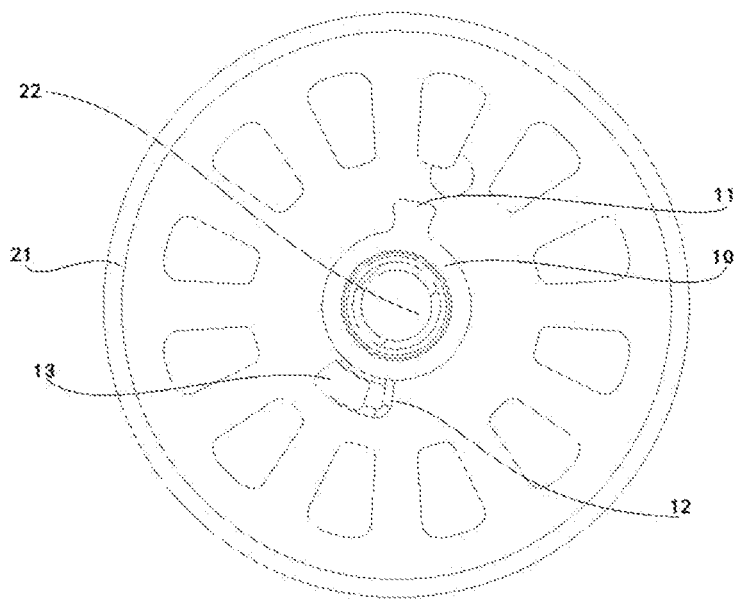
FIG. 1 is a schematic view of a first embodiment of a motor mechanical limiting device according to the present application.

Referring to FIG. 1, a motor mechanical limiting device for limiting rotation of a motor includes: a limiting ring 10, a first limiting device 12 and a second limiting device 13. The first limiting device 12 is fixedly connected on a rotor 22 of motor. The second limiting device 13 is fixed on a motor stator 21. The limiting ring 10 is in bearing connection with the rotor 22 of motor. The limiting ring 10 protrudes to form a stopping edge 11. Both the first limiting device 12 and the second limiting device 13 are located on a circumferential rotation path of the stopping edge 11. The second limiting device 13 is provided with a region (not shown in the figure) for the first limiting device 12 to pass through. Specifically, the first limiting device 12 includes: a connecting ring (not shown in the figure) and a first connecting rod (not shown in the figure). The connecting ring is fixedly sleeved over the rotor of motor. One end of the first connecting rod is connected to the connecting ring, and the other end of the first connecting rod is bent to form a stopping head (not shown in the figure). During rotation, the stopping head pushes the stopping edge, so as to drive the limiting ring to rotate. The connecting ring is located under the limiting ring, and the stopping head is located under the second limiting device 13. The second limiting device includes: a stop member (not shown in the figure) and a second connecting rod (not shown in the figure). One end of the second connecting rod is fixed on the stator, and the other end of the second connecting rod is connected to the stop member. A region for the stopping head to pass through is formed between the second connecting rod and the stop member. The stop member is a block-like bump that is connected on the second connecting rod and has a shape consistent with that of the stopping head. According to different application scenarios, the shape of the stopping head and the stop member can be (but not limited to): a column, a triangle, and a sphere. The second connecting rod is connected at an external side of the stop member. Therefore, a notch for the stopping head to pass through is formed between the stop member and the stator.

Figure 2:
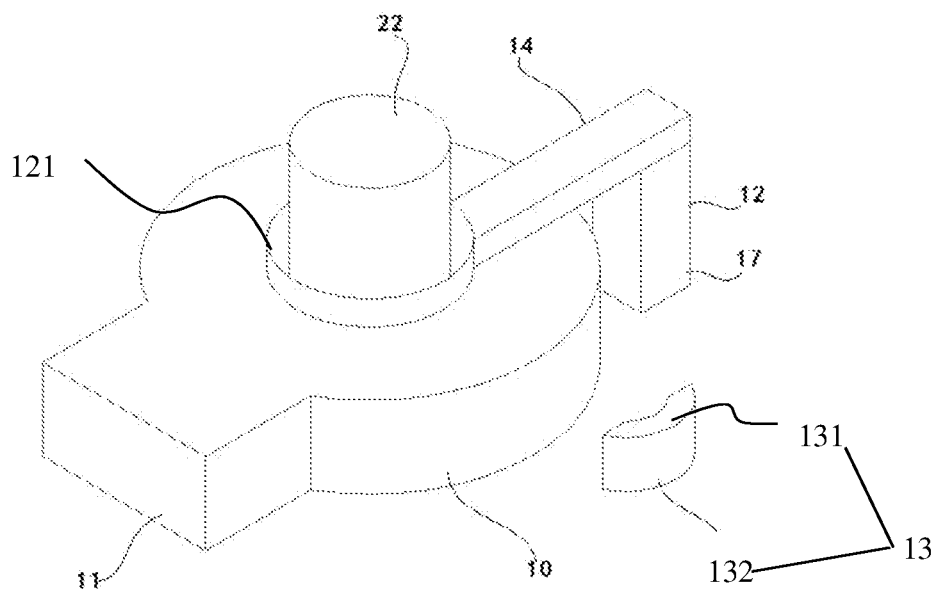
FIG. 2 is a schematic view of a second embodiment of a motor mechanical limiting device according to the present application.

Referring to FIG. 2, in some embodiments, a motor mechanical limiting device for limiting rotation of a motor includes: a limiting ring 10, a first limiting device 12, and a second limiting device 13. The first limiting device 12 is fixedly connected on a rotor 22 of motor. The second limiting device 13 is fixed on a motor stator 21. The limiting ring 10 is in bearing connection with the rotor 22 of motor. The limiting ring 10 protrudes to form a stopping edge 11. Both the first limiting device 12 and the second limiting device 13 are located on a circumferential rotation path of the stopping edge. The second limiting device 13 is provided with a region (not shown) for the first limiting device 12 to pass through. Specifically, the first limiting device 12 includes: a third connecting rod 14 and a stopping head 17 formed by a protrusion at one end of the third connecting rod. The other end of the third connecting rod 14 is fixed on the rotor 22 of motor. During rotation, the stopping head 17 pushes the stopping edge 11, so as to drive the limiting ring 10 to rotate. The third connecting rod 14 is located above the limiting ring 10, and the stopping head 17 is located above the second limiting device 13. The second limiting device includes: a stop member (not shown). The stop member is a stop block (not shown) fixed on the stator of motor. The height of the stop block is less than a distance between the bottom of the stopping head 17 and the stator 21 of motor. Therefore, the region above the stop member is a region for the stopping head to pass through. The shape of the stop member is consistent with that of the stopping head. According to different application scenarios, the shape of the stopping head and the stop member can be (but not limited to): a column, a triangle, a square or a sphere.

Figure 3:
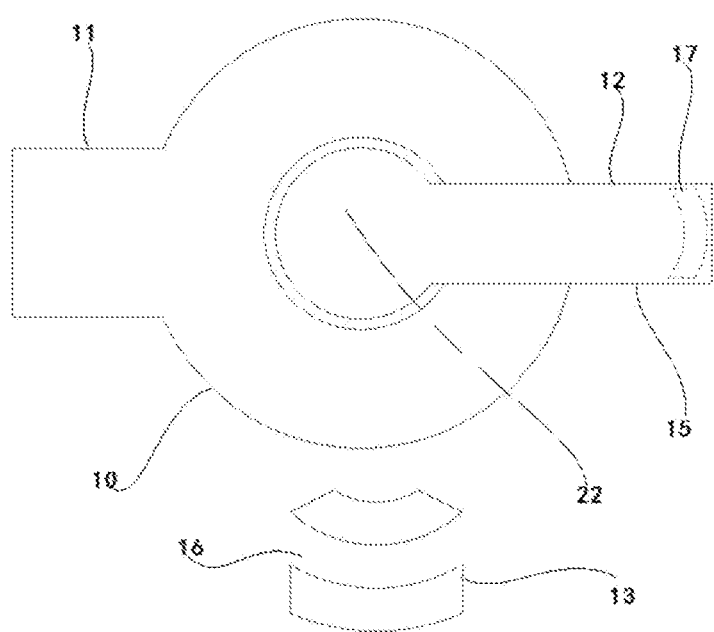
FIG. 3 is a schematic view of a third embodiment of a motor mechanical limiting device according to the present application.

Referring to FIG. 3, in some embodiments, a motor mechanical limiting device for limiting rotation of a motor includes: a limiting ring 10, a first limiting device 12, and a second limiting device 13. The first limiting device 12 is fixedly connected on a rotor 22 of motor. The second limiting device 13 is fixed on a motor stator 21. The limiting ring 10 is in bearing connection with the rotor 22 of motor. The limiting ring 10 protrudes to form a stopping edge 11. Both the first limiting device 12 and the second limiting device 13 are located on a circumferential rotation path of the stopping edge. The second limiting device 13 is provided with a region for the first limiting device 12 to pass through. Specifically, the first limiting device 12 includes: a fourth connecting rod 15 and a stopping head 17 formed by a protrusion formed at one end of the fourth connecting rod. The other end of the fourth connecting rod 15 is fixed on the rotor 22 of motor. During rotation, the stopping head 17 pushes the stopping edge 11, so as to drive the limiting ring 10 to rotate. The fourth connecting rod 15 is located above the limiting ring 10, and the stopping head 17 is located above the second limiting device 13. The second limiting device 13 includes: a stop member (not shown). The stop member is a stop block (not shown) provided with an arc-shaped channel in a middle portion. The size of the arc-shaped channel fits the size of the bottom of the stopping head, forming a region 16 for the stopping head to pass through.

In the present application, the rotation angle range of a motor mounted with the motor mechanical limiting device is: greater than 0° and less than 720°. The degree of the angle limited by the motor mechanical limiting device lies in the degree of an angle occupied by the stopping head, the stopping edge and the limiting member when they are in contact. Therefore, an actual rotation angle of the rotor is 720° minus the intersection angle occupied by the shopping head, the stopping edge and the limiting member when they are in contact.

A specific operation process of the present application is as follows: The rotor of motor rotates and drives the first limiting device fixedly connected with the rotor to rotate simultaneously. After the first limiting device rotates at a certain angle, the stopping head contacts the stopping edge on the limiting ring and the limiting ring is in bearing connection with the rotor. Therefore, when the rotor rotates, the limiting ring does not rotate. After contacting the stopping edge, the stopping head pushes the limiting ring to rotate together. After the limiting ring and the stopping head rotate together at a certain angle, the limiting ring contacts the second limiting device and the rotation stops. The first limiting device may pass by the position of the second limiting device before contacting the limiting ring.

Embodiment 2

Figure 4:
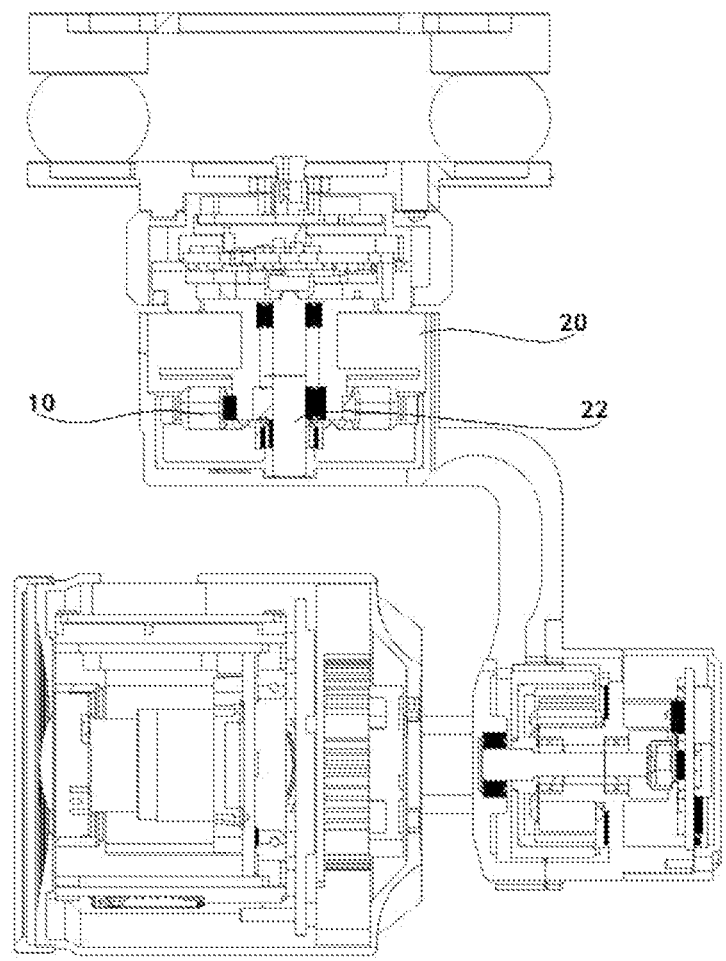
FIG. 4 is a schematic view of a gimbal according to the present application.

Referring to FIG. 4, a gimbal includes a yaw axis structure 20 driving the whole gimbal to rotate. The gimbal rotates around the yaw axis structure and the rotation is preset in a certain range. The gimbal further includes a motor mechanical limiting device disposed on the yaw axis structure, and the motor mechanical limiting device defines a maximum rotation angle of the gimbal around the yaw axis. The motor mechanical limiting device used on the yaw axis structure is the motor mechanical limiting device described in Embodiment 1.

In this embodiment, the gimbal employs double limiting devices: a mechanical limiting device and a software limiting device. A motor used on the yaw axis structure is a servo motor that can conduct an accurate angle control according to pulses. A maximum rotation angle is set in a servo motor control program to ensure that the rotation of the motor is within a defined range. The motor mechanical limiting device is used as guarantee of the software-controlled limiting device, so as to prevent the internal cables of the gimbal from damaging in the case when the motor is out of control due to any causes that leads to the malfunction of the motor rotation.

The present application has the following beneficial effect: Double angle limiting devices are used, ensuring rotation reliability of the gimbal. The motor mechanical limiting device is used, so that the gimbal can implements a rotation of more than 360°, improving the performance of the gimbal.

It should be noted that although the specification of the present application and the accompanying drawings thereof have given preferred embodiments of the present application, the present application can be implemented in many different forms and is not limited to the embodiments described in the specification. The embodiments are not used as extra limit on the content of the present application. The embodiments are provided so that the disclosure of the present application can be understood more thoroughly and comprehensively. Moreover, the technical features above can be further combined with each other to form various embodiments that are not listed above, which are all considered within the disclosure range of the specification of the present application. Further, a person of ordinary skill in the art can improve or change the foregoing description, and all the improvements and changes should belong to the protection scope of the present application.

What is claimed is:

1. A gimbal, comprising a yaw axis structure driving the whole gimbal to rotate, the gimbal rotating around the yaw axis structure and the rotation being preset in a certain range, wherein the gimbal further comprises at least a two motor mechanical limiting device for defining a maximum rotation angle of the gimbal around the yaw axis; wherein the motor mechanical limiting device comprising:

a limiting ring, a first limiting device, and a second limiting device, wherein the first limiting device is fixedly connected on a rotor of a motor, the second limiting device is fixed on a motor stator, and the limiting ring is in bearing connection with the rotor of the motor, wherein the limiting ring protrudes to form a stopping edge, both the first limiting device and the second limiting device are located on a circumferential rotation path of the stopping edge, and wherein the second limiting device is provided with a region for the first limiting device to pass through.

2. The gimbal according to claim 1, wherein the first limiting device comprises: a connecting ring and a first connecting rod, wherein the connecting ring is fixedly sleeved over the rotor of the motor, one end of the first connecting rod is connected to the connecting ring, and the other end of the first connecting rod is bent to form a stopping head, and wherein during rotation, the stopping head pushes the stopping edge, so as to drive the limiting ring to rotate.

3. The gimbal according to claim 2, wherein the connecting ring is located under the limiting ring, and the stopping head is located under the second limiting device.

4. The gimbal according to claim 2, wherein the second limiting device comprises: a stop member and a second connecting rod, wherein one end of the second connecting rod is fixed on the stator, the other end of the second connecting rod is connected to the stop member, and wherein a region for the stopping head to pass through is formed between the second connecting rod and the stop member.

5. The gimbal according to claim 1, wherein the first limiting device comprises: a connecting rod, wherein a protrusion of one end of the third connecting rod forms a stopping head, the other end of the third connecting rod is fixed on the rotor of the motor, and wherein during rotation, the stopping head pushes the stopping edge, so as to drive the limiting ring to rotate.

6. The gimbal according to claim 5, wherein the third connecting rod is located above the upper limiting ring, and the stopping head is located upper the second limiting device.

7. The gimbal according to claim 1, wherein the second limiting device comprises: a stop block, wherein the block is fixed on the stator of the motor, the height of the stop block is less than a distance between the bottom of the stopping head and the stator of the motor.

8. The gimbal according to claim 1, wherein the first limiting device comprises: a connecting rod, wherein a protrusion of one end of the fourth connecting rod formed a stopping head, the other end of the fourth connecting rod is fixed on the rotor of the motor, and wherein during rotation, the stopping head pushes the stopping edge, so as to drive the limiting ring to rotate.

9. The gimbal according to claim 8, wherein the fourth connecting rod is located above the upper limiting ring, and the stopping head is located upper the second limiting device.

10. The gimbal according to claim 8, wherein the second limiting device comprises: a stop block, wherein the middle portion of the stop block provided an arc-shaped channel, the size of the arc-shaped channel fits the size of the bottom of the stopping head, forming a region 16 for the stopping head to pass through.

11. The gimbal according to claim 1, wherein a motor of the yaw axis structure is a servo motor.

12. The gimbal according to claim 1, wherein the rotation angle range of the rotor of the motor is greater than 0° and less than 720°.

* * * * *